(12) United States Patent
Takanashi

(10) Patent No.: US 11,273,670 B2
(45) Date of Patent: Mar. 15, 2022

(54) HUB UNIT BEARING

(71) Applicant: NSK LTD., Tokyo (JP)

(72) Inventor: Harumi Takanashi, Kanagawa (JP)

(73) Assignee: NSK LTD., Tokyo (JP)

(*) Notice: Subject to any disclaimer, the term of this patent is extended or adjusted under 35 U.S.C. 154(b) by 547 days.

(21) Appl. No.: 16/090,847

(22) PCT Filed: Mar. 24, 2017

(86) PCT No.: PCT/JP2017/012053
§ 371 (c)(1),
(2) Date: Oct. 3, 2018

(87) PCT Pub. No.: WO2017/179400
PCT Pub. Date: Oct. 19, 2017

(65) Prior Publication Data
US 2019/0105946 A1    Apr. 11, 2019

(30) Foreign Application Priority Data

Apr. 12, 2016 (JP) .............................. JP2016-079215
Mar. 10, 2017 (JP) .............................. JP2017-046553

(51) Int. Cl.
*B60B 27/00* (2006.01)
*F16C 33/58* (2006.01)
(Continued)

(52) U.S. Cl.
CPC .......... *B60B 27/0047* (2013.01); *B60B 27/00* (2013.01); *B60B 27/0005* (2013.01);
(Continued)

(58) Field of Classification Search
CPC . B60B 27/00; B60B 27/0005; B60B 27/0047; B60B 27/0052; B60B 27/0078; B60B 27/0084; B60B 27/0094
See application file for complete search history.

(56) References Cited

U.S. PATENT DOCUMENTS 8,393,974 B2 * 3/2013 Hirai .................. B60B 27/0042
464/178
9,283,808 B2 * 3/2016 Meeker .................. F16C 39/02
(Continued)

FOREIGN PATENT DOCUMENTS

JP    2009 166787 A    7/2009
JP    2010-907 A       1/2010
(Continued)

OTHER PUBLICATIONS

International Search Report and Written Opinion dated Jun. 7, 2017, from International Application No. PCT/JP2017/012053, 8 sheets.
(Continued)

*Primary Examiner* — Jason R Bellinger
(74) *Attorney, Agent, or Firm* — Katten Muchin Rosenman LLP

(57) ABSTRACT

To obtain a structure wherein water having entered the gap between the bottom surface of an annular groove in a rotation-side flange and the inside surface in the axial direction of the brake rotor can be easily drained to the outer space. The outer diameter DO of the annular groove 15 is larger than the diameter DDI of the inscribed circle of the opening portion outside in the axial direction of the water drain holes 17a and is smaller than the diameter DDO of the circumscribed circle of the opening portion outside in the axial direction of the water drain holes 17a.

5 Claims, 10 Drawing Sheets

(51) Int. Cl.
    F16C 35/06 (2006.01)
    F16C 19/18 (2006.01)
    B60B 27/02 (2006.01)
    F16D 65/02 (2006.01)

(52) U.S. Cl.
    CPC .......... B60B 27/0078 (2013.01); B60B 27/02 (2013.01); F16C 19/18 (2013.01); F16C 33/581 (2013.01); F16C 35/06 (2013.01); B60B 2380/12 (2013.01); B60B 2900/212 (2013.01); F16C 19/186 (2013.01); F16C 2326/02 (2013.01); F16D 2065/1384 (2013.01)

(56) References Cited

U.S. PATENT DOCUMENTS

| | | |
|---|---|---|
| 2013/0147258 A1 | 6/2013 | Falsetti |
| 2015/0078691 A1* | 3/2015 | Nakamura ........ B60B 27/0068 384/448 |
| 2016/0023512 A1 | 1/2016 | Duch |
| 2018/0135702 A1 | 5/2018 | Nakatsuji |

FOREIGN PATENT DOCUMENTS

| | | |
|---|---|---|
| JP | 2010-89664 A | 4/2010 |
| JP | 2016-2916 A | 1/2016 |
| JP | 2016-7881 A | 1/2016 |
| WO | 2017010555 A1 | 1/2017 |

OTHER PUBLICATIONS

Extended European Search Report dated Dec. 11, 2019, from the counterpart European patent application 17782218.6, 5 sheets.

* cited by examiner

PRIOR ART

HUB UNIT BEARING

CROSS-REFERENCE TO RELATED APPLICATIONS

This application is a U.S. National Stage entry of International Application No. PCT/JP2017/012053 filed Mar. 24, 2017, which claims the benefit of JP Patent Application No. 2016-079215, filed Apr. 12, 2016 and JP Patent Application No. 2017-046553, filed Mar. 10, 2017, each of which is herein incorporated by reference in its entirety for all purposes.

TECHNICAL FIELD

This invention relates to a hub unit bearing for supporting the wheels of an automobile so as to be able to rotate freely with respect to the suspension.

BACKGROUND ART

The wheels and the brake rotor of an automobile are supported by a hub unit bearing so as to rotate freely with respect to the suspension. FIGS. 9 and 10 illustrate an example of a conventional hub unit bearing described in JP2016-002916.

In the example illustrated in FIGS. 9 and 10, the hub unit bearing 1 is for driven wheel and it comprises an outer ring 2 which is an outer member, a hub 3 which is an inner member as well as a rotating member, and a plurality of rolling elements 4. The outer ring 2 has double row outer-ring raceways 8 on the inner circumferential surface and is supported and secured to a suspension (not shown) via knuckle 20. The hub 3 is located coaxially with the outer ring 2 on the inner diameter side of the outer ring 2, and it has double row inner-ring raceways 9 that face the double row outer-ring raceways 8 and a rotating-side flange 11 for supporting the wheels and the brake rotor. Further, the hub 3 has an engaging hole 33 that engages with a constant velocity joint. The rolling elements 4 are located between each of the double row outer-ring raceways 8 and the double row inner-ring raceways 9 so as to be able to roll freely. The hub 3 is freely rotatably supported with respect to the outer ring 2 via the rolling elements 4 due to such a construction. Both ends in the axial direction of a cylindrical space between the inner circumferential surface of the outer ring 2 and the outer circumferential surface of the hub 3 are sealed by seal members 7a and 7b.

In the examples illustrated in the figures, the hub 3 comprises a hub body 5 and an inner ring 6 which is fitted with an interference fit onto the inside end section in the axial direction of the hub body 5. Here, "inside" in the axial direction is defined as the center side in the width direction of the vehicle body in a state where the hub unit bearing 1 is installed in the suspension, and the right side in FIG. 9 corresponds to this. On the contrary, the left side in FIG. 9, that is outside in the width direction of the vehicle body in a state where the hub unit bearing 1 is installed in the suspension, is defined as "outside" in the axial direction. Further, "radial direction" and "circumferential direction" are defined as its respective directions in relation to the hub 3 unless otherwise specified.

The inner-ring raceway 9 on the outside in the axial direction among the double row inner-ring raceways is provided on the outer circumferential surface of the middle section in the axial direction of the hub body 5. Further, the rotating-side flange 11 is provided at the outside end portion in the axial direction of the hub body 5 so as to protrude outward in the radial direction. The wheel 21 and the brake rotor 22 are connected and secured to the rotating-side flange 11 by hub bolts 13 and hub nuts 23. So the rotating-side flange 11 has mounting holes 12 at a plurality of locations in the circumferential direction that pass through the rotating-side flange 11 in the axial direction. A base end section of the shaft section of each of the hub bolts 13 is press-fitted to the corresponding mounting hole 12. The middle section of the shaft section of the hub bolt 13 is inserted through the through hole 35 of the wheel 21 and the through hole 36 of the brake rotor 22. Further, the hub nuts 23 are respectively screwed onto the screw section of the hub bolts 13. The rotating-side flange 11, the wheel 21, and the brake rotor 22 are jointly fastened due to this construction.

On the flange surface 14 which is an outside surface in the axial direction of the rotating-side flange 11, an annular groove 15, which has an annular shape that is centered about the center axis of the hub 3, and is recessed inward in the axial direction, is provided all the way around in the middle section in the radial direction of the flange surface 14. The opening portions on the outside in the axial direction of all the mounting holes 12 are provided on the bottom surface 16 of the annular groove 15. In other words, the mounting holes 12 are open only to the bottom surface 16 of the annular groove 15. With this kind of construction, the hub bolts 13 are press-fitted to the mounting holes 12 so that even if the portions around the opening portions on the outside in the axial direction of the mounting holes 12 plastically deform and swell, it is possible to retain these plastically deformed bumps inside the annular groove 15. As a result, the effect to the runout accuracy of the flange surface that is caused by press-fitting the hub bolts to the mounting holes 12 is removed.

As illustrated in FIG. 10, the rotating-side flange 11 has a water drain hole 17 and a setscrew hole 18 that respectively pass through the rotating-side flange 11 in the axial direction and open only to the bottom surface 16 of the annular groove 15. The water drain hole 17 functions as a drainage canal to drain water that entered the gap between the inside surface in the axial direction of the brake rotor 22 and the bottom surface of the annular groove 15 to the outer space. That is, water such as rain water and muddy water enters the gap 32 through the setscrew hole 18, the water drain hole 17, an abutment part of the inside surface in the axial direction of the brake rotor 22 and the flange surface 14 where is a contact section of metal, and the fitting portion between the hub bolts 13 and mounting holes 12. The water having entered the gap 32 is drained to the outer space from the water drain hole 17.

The setscrew hole 18 is used to provisionally tack the brake rotor 22 with respect to the rotating-side flange 11, and to screw the bolts for separating the brake rotor 22 that has been fixed to the flange surface 14 by rust and the like from the flange surface 14 when performing maintenance.

RELATED LITERATURE

Patent Literature

[Patent Literature 1] JP2016-002916(A)

SUMMARY OF THE INVENTION

Problems to be Solved by the Invention

In the construction disclosed in JP2016-002916, the water drain hole 17 is open in the middle section in the radial direction of the bottom surface 16 of the annular groove 15. Because of this, the water having entered the gap 32 is not completely drained from the water drain holes 17 to the outer space so that there is a possibility that part of the water may remain in a portion located on the outer diameter side than the water drain hole 17 of the gap 32. Due to the centrifugal force in relation to the rotation of the vehicle wheel, the water remained in the gap 32 enters between the inside surface in the axial direction of the brake rotor 22 and the flange surface 14 so that there is a possibility that it may cause deterioration due to rust and progress of the rust, as well as adhesion due to fretting.

In view of circumstances as stated above, the present invention aims to provide a hub unit bearing comprising a rotating-side flange having construction wherein the water has entered the gap between the bottom surface of the annular groove of the rotating-side flange and the inside surface in the axial direction of the brake rotor to be easily drained to the outer space.

Means for Solving the Problems

The hub unit bearing of the present invention comprises an outer member having an outer-ring raceway on the inner circumferential surface, an inner member having an inner-ring raceway on the outer circumferential surface, and a plurality of rolling elements located between the outer-ring raceway and the inner-ring raceway so as to be able to roll freely. Either of the outer member or the inner member corresponds to a rotating member that rotates in use and the rotating member comprises a rotating-side flange protruding outward in the radial direction. The rotating-side flange has an annular groove provided on the outside surface in the axial direction, a plurality of mounting holes that open in the bottom surface of the annular groove, and a plurality of water drain holes that pass through in the axial direction of the rotating-side flange. The outer diameter of the annular groove is larger than the diameter of the inscribed circle of the opening portion on the outside in the axial direction of the water drain holes and is smaller than the diameter of the circumscribed circle of the opening portion on the outside in the axial direction of the water drain holes.

In other words, the outer end portions in the radial direction of the water drain holes are open in portions of the outside surface in the axial direction of the rotating member that locate on the outer side in the radial direction than the annular groove, and the rest portions of the water drain holes excluding the outer end portions in the radial direction of the water drain holes are open in the bottom surface of the annular groove.

More specifically, in order for the outer end portions in the radial direction of the water drain holes to be open in the outside surface in the axial direction of the rotating member, partially cylindrical concave surface portions that are recessed outward in the radial direction are provided on the peripheral surface on the outer diameter side of the annular groove. In the present invention, it can be interpreted that the concave surface portions correspond to an element of the water drain holes. Alternatively, in the present invention, it is also possible to consider that the concave surface portions correspond to an element of the annular groove and the outer end portions of the water drain holes are open in the outside surface in the axial direction of the rotating member via the concave surface portions of the annular groove. However, as long as the outer end portions in the radial direction of the water drain holes are open in portions located on the outer side in the radial direction than the annular groove, such construction is included within the range of the present invention.

In the case of embodying the present invention, it is preferable to employ construction in which the inner circumferential surface of the water drain holes is inclined in a direction such that the inner diameter of the inner circumferential surface becomes larger toward inward in the axial direction. Otherwise, it is also possible to employ construction in which the water drain holes have an inclined surface on the inner circumferential surface of a portion which is overlapped with the annular groove in the radial direction, such that the inclined surface is inclined in a direction directed outward in the radial direction toward inside in the radial direction. Further, it is also possible to employ construction in which the center axis of the water drain hole is arranged in a direction directed inward in the radial direction toward outside in the axial direction.

The hub unit bearing of the present invention is, for example, it is possible to employ construction in which the water drain holes are arranged on both sides of at least one of the mounting holes with respect to the circumferential direction of the rotating member. In this case, it is preferable that the mounting holes are located on the inner side in the radial direction than the common tangent of the openings on the outside in the axial direction of the water drain holes that are located on both sides of the mounting holes with respect to the circumferential direction. Further, it is possible to employ construction in which the water drain holes are arranged on both sides of all of the mounting holes with respect to the circumferential direction of the rotating member. In this case, the number of the water drain holes can be the same number as of the mounting holes or twice the mounting holes. When the number of the water drain holes is set so as to be the same as the number of the mounting holes, the water drain holes and the mounting holes are located alternatively with respect to the circumferential direction.

In the case of embodying the present invention, it is possible to employ construction having a female screw portion on the inner circumferential surface of the mounting hole.

Effect of the Invention

With the hub unit bearing of the present invention, it becomes difficult for the water which has entered the gap between the bottom surface of the annular groove of the rotating-side flange and the inside surface in the axial direction of the brake rotor to be retained within this gap and it is possible to easily drain the water to the outer space through the water drain hole.

MODE FOR CARRYING OUT THE INVENTION

First Example of First Embodiment

Figure 1:
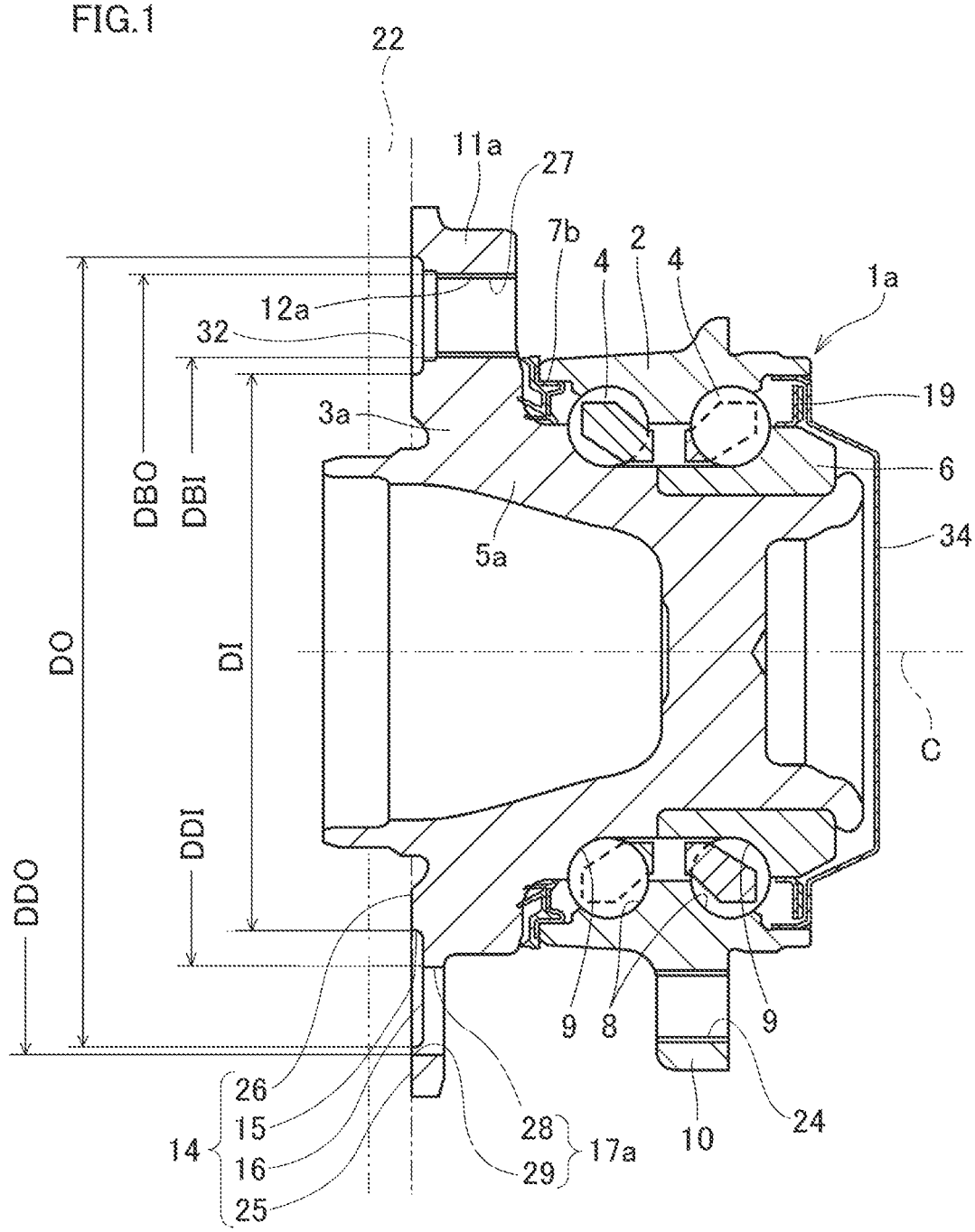
FIG. 1 is a cross-sectional view of a first example of a first embodiment of the present invention.
Figure 2:
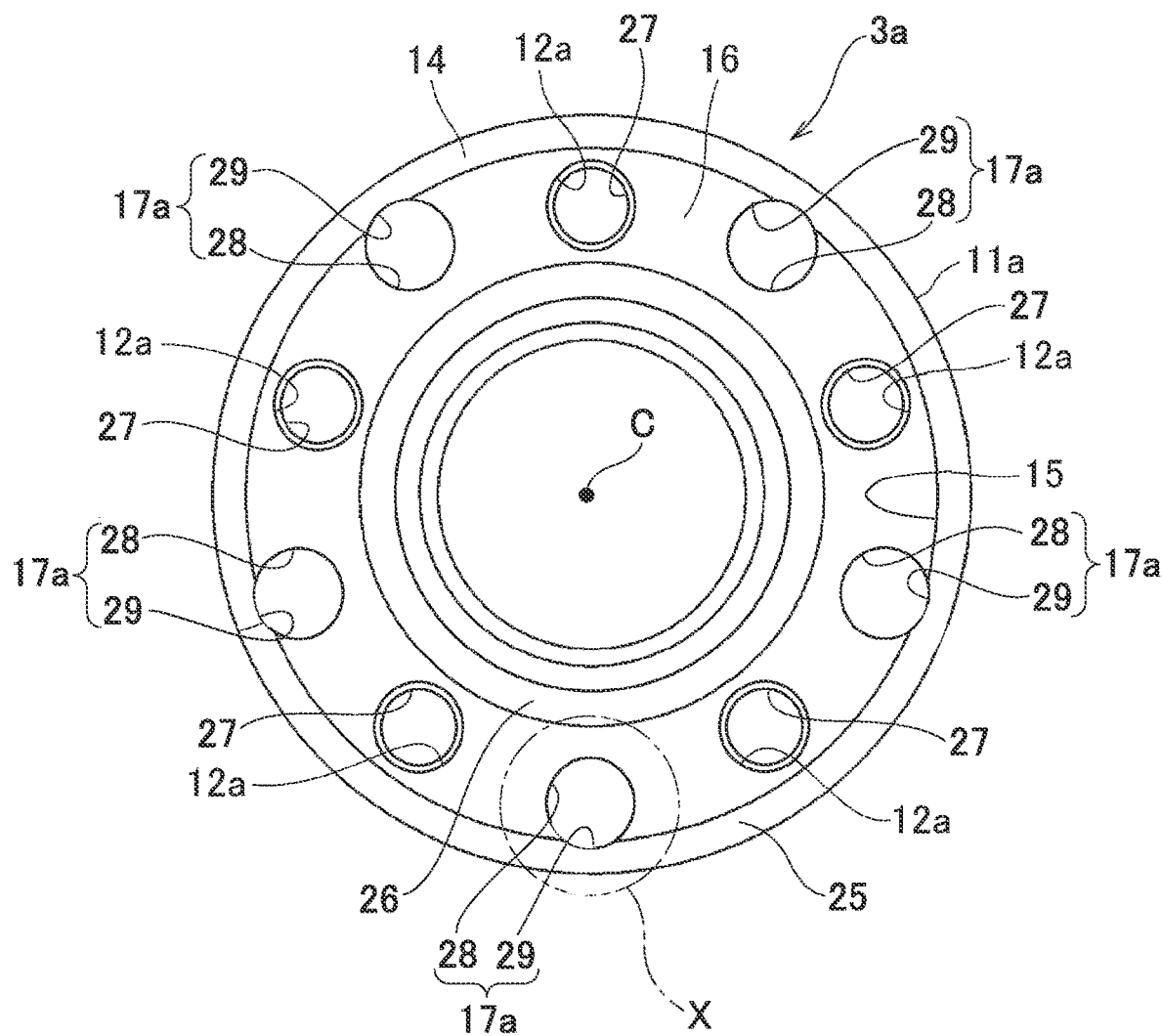
FIG. 2 is an end view of the first example of the first embodiment as seen from left in FIG. 1.
Figure 3:
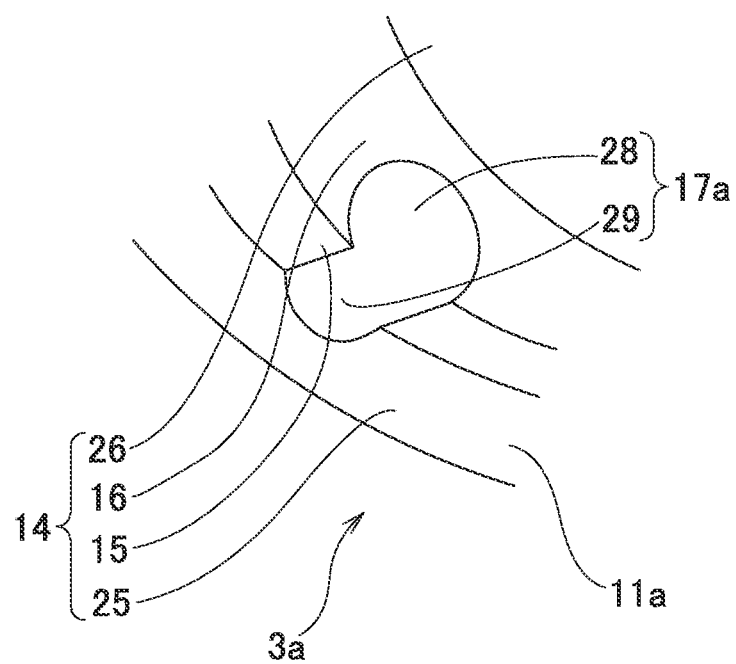
FIG. 3 is an enlarged perspective view of X part of FIG. 2.

FIG. 1 to FIG. 3 illustrate a first example of a first embodiment of the present invention. Although it is not limited to this, in the first example, the present invention is applied to a hub unit bearing 1a for a non-driven wheel in which the inner ring rotates. The hub unit bearing 1a comprises an outer ring 2, a hub 3a, which is an inner member and a rotating member, and a plurality of rolling elements 4.

The outer ring 2 is made of hard metal such as medium carbon steel, and is generally cylindrical as a whole. The outer ring 2 has double row outer-ring raceways 8 formed around the inner circumferential surface thereof. Further, the outer ring 2 has a stationary side flange 10 protruding outward in the radial direction formed in the middle section in the axial direction. The stationary side flange 10 has supporting holes 24 at a plurality of locations in the circumferential direction. The outer ring 2 is secured to a knuckle 20 of the suspension (see FIG. 9) by using bolts that are inserted through or screwed into the supporting holes 24.

The hub 3a is made of hard metal such as medium carbon steel, and is positioned coaxially with the outer ring 2 on the inner diameter side of the outer ring 2. The hub 3a has double row inner-ring raceways 9 formed around the outer circumferential surface thereof. Further, the hub 3a has a rotating-side flange 11a protruding outward in the radial direction on an outside portion in the axial direction of the hub 3a that is located on the outside in the axial direction than the outside end surface of the outer ring 2.

Here, "outside" in the axial direction is defined as the side toward the outside in the width direction of the vehicle body in a state where the hub unit bearing 1a is fixed to the suspension. The left side in FIG. 1 corresponds to this. On the contrary, the right side in FIG. 1 that is the center side in the width direction of the vehicle body in a state where the hub unit bearing 1a is fixed to the suspension is defined as "inside". Further, "radial direction" and "circumferential direction" are defined as its respective directions in relation to the rotating member (in this example, the hub 3a) unless otherwise specified.

In this example, the hub 3a comprises a hub body 5a and an inner ring 6. Among the double row inner-ring raceways 9, an inner-ring raceway 9 on the outside in the axial direction is formed in the middle section in the axial direction around the outer circumferential surface of the hub body 5a. Further, the rotating-side flange 11a is provided on the outside end section in the axial direction of the hub body 5a so as to protrude outward in the radial direction. The inner ring 6 is formed into a cylindrical shape, and it has an inner-ring raceway 9 on the inside in the axial direction formed around the outer circumferential surface of the inner ring 6. The inner ring 6 is fitted with an interference fit onto the inside end section in the axial direction of the hub body 5a.

The rotating-side flange 11a has a flange surface 14 which is the outside surface in the axial direction of this rotating-side flange 11a, a plurality of mounting holes 12a (five holes in this example), and a water drain holes 17a. The flange surface 14 has an annular groove 15 that is recessed inward in the axial direction in the middle section in the radial direction. It also has an outer abutting portion 25 on the outer side in the radial direction than the annular groove 15 and an inner abutting portion 26 on the inner side in the radial direction than the annular groove 15.

The annular groove 15 is formed into a circular ring shape having a reference axis C which is the center axis of the hub 3a as the center, and its cross-sectional shape is approximately rectangular. The annular groove 15 has a circular ring shaped bottom surface 16 that is orthogonal to the reference axis C. That is, the depth of the annular groove 15 in the axial direction is constant all the way around, and the bottom surface 16 is a flat surface. Further, the width of the annular groove 15 in the radial direction is also constant. The depth of the annular groove 15 in the axial direction and the width in the radial direction is suitably set according to the material forming the hub 3a and the nominal diameter of the hub bolts screwed into female screw portions 27 of the mounting holes 12a. That is, the depth of the annular groove 15 in the axial direction and the width in the radial direction is set on designing such that the bumps occurred around the opening portions on the outside in the axial direction of the mounting holes 12a to be retained within the annular groove 15 when the hub bolts are screwed into the female screw portions 27 of the mounting holes 12a, as described later.

Specifically, the depth in the axial direction of the annular groove 15 is defined from the aspect of keeping the bumps according to the screwing of the hob bolts to be retained within the annular groove 15 while preventing deterioration in the strength of the rotating-side flange 11a, as well as preventing water to be retained in the gap 32 between the annular groove 15 and the inside surface in the axial direction of the brake rotor 22 due to capillary phenomenon. More specifically, in a hub unit bearing for general cars, the depth in the axial direction of the annular groove 15 is preferably 1 mm to 3 mm, and more preferably 1.5 mm to 2 mm.

Further, the width in the radial direction of the annular groove 15 is defined considering deformation due to the process of forming the female screw portions 27, as well as deformation of the rotating-side flange 11a, wheel 21, brake rotor 22 due to the axial force that occurs when screwing the hub bolts into the female screw portions 27 of the mounting holes 12a. Specifically, in a hub unit bearing for general cars, it is preferable to be 1.2 to 2 times the inner diameter of the prepared holes before forming the female screw portions 27 in the inner circumferential surface of the mounting holes 12a. When female screw portions 27 are formed by tapping, it is preferable to be 1.5 to 1.7 times larger. When the female screw portions 27 are formed by component rolling where the inner diameter of the female screw portions 27 becomes larger than forming by tapping, it is more preferable to be 1.4 to 1.6 times larger.

The outer abutting portion 25 and the inner abutting portion 26 are both orthogonal to the reference axis C, and are generally circular ring shaped flat surface continuous all around in the circumferential direction (there is no discontinuous portion).

The mounting holes 12a are uniformly spaced in a plurality of portions in the circumferential direction of the middle section in the radial direction of the rotating-side flange 11a and have female screw portions 27 on the inner circumferential surface. The mounting holes 12a pass through the rotating-side flange 11a in the axial direction and are open only to the bottom surface 16 of the annular groove 15. In other words, the bottom surface 16 of the annular groove 15 contains the entire opening portion on the outside in the axial direction of the mounting holes 12a. The inner diameter of the mounting holes 12a is the same among all the mounting holes 12a, and the center of the circle that passes through the center axis of all the mounting holes 12a exists on the reference axis C. Further, the inner diameter of the mounting holes 12a is smaller than the width in the radial direction of the annular groove 15. That is, part of the bottom surface 16 of the annular groove 15 exists on portions adjoining to both sides in the radial direction of the opening portions on the outside in the axial direction of the mounting holes 12a. Therefore, the outer diameter DO of the annular groove 15 is larger than the diameter DBO of the circumscribed circle of the mounting holes 12a that is centered about the reference axis C (DO>DBO), and the inner diameter DI of the annular groove 15 is smaller than the diameter DBI of the inscribed circle of the mounting holes 12a that is centered about the reference axis C (DI<DBI).

The wheel 21 (see FIG. 9) and the brake rotor 22 are connected and secured to the rotating-side flange 11a by hub bolts that are screwed into the female screw portions 27 of the mounting holes 12a. The same as in the case of the structure illustrated in FIG. 9, the base ends of the shaft sections of the hub bolts are press-fitted to the mounting holes 12a, and brake rotor 22 and wheel 21 are jointly fastened by a hub nut so that it is possible for the brake rotor 22 and the wheel 21 to be connected and secured to the rotating-side flange 11.

In the present invention, the number of the water drain holes 17a is arbitrary. However, in this example, the water drain holes 17a are uniformly spaced in a plurality of portions in the circumferential direction of the rotating-side flange 11a and are located in the center position of the mounting holes 12a adjacent to each other in the circumferential direction so that they pass through the rotating-side flange 11a in the axial direction. That is, the water drain holes 17a are located on both sides of all the mounting holes 12a in relation to the circumferential direction, and the number of the water drain holes 17a is five as the same number as the mounting holes 12a. The water drain holes 17a respectively comprise a through portion 28 that passes through between the inside surface in the axial direction of the rotating-side flange 11a and the bottom surface 16 of the annular groove 15 and a cylindrical concave surface portion 29 that is located in the outer-diameter side peripheral surface of the annular groove 15 in a state recessed outward in the radial direction. In this example, the inner diameter of the water drain holes 17a is constant all the way in the axial direction. That is, through portions 28 and concave surface portions 29 exist on the single cylindrical surface. In other words, the inner diameter of the through portions 28 is twice the radius of curvature of the concave surface portions 29.

All the water drain holes 17a have the same inner diameters, and the center of the circles that pass through all the center axis of the mounting holes 12a exist on the reference axis C. The outer end portions of the water drain holes with respect to the radial direction of the hub 3a are open in the outer abutting portion 25, and the rest portions excluding the outer end portions are open in the bottom surface 16 of the annular groove 15. In other words, the peripheral line of the annular groove 15 crosses the water drain holes 17a in the circumferential direction of the hub 3a. As such, the outer diameter DO of the annular groove 15 is larger than the diameter DDI of the inscribed circle of the water drain holes 17a that is centered about the reference axis C, and is smaller than the diameter DDO of the circumscribed circle of the water drain holes 17a that is centered about the reference axis C.

Here, in this example, the diameter DDI of the inscribed circle of the water drain holes 17a is larger than the inner diameter DI of the annular groove 15 (DI<DDI). However, the diameter DDI of the inscribed circle of the water drain holes 17a can be smaller than the inner diameter DI of the annular groove 15 (DDI<DI). In this case, the inner end portions of the water drain holes 17a in relation to the radial direction are open on the inner abutting portion 26.

Further, the diameter DDO of the circumscribed circle of the water drain holes is smaller than the outer diameter of the flange surface 14. That is, the water drain holes 17a are not open to the outer circumferential surface of the rotating-side flange 11a.

The rolling elements 4 are located between each of double row outer-ring raceways 8 and double row inner-ring raceways 9 so as to be able to roll freely. In this example, the diameter of the pitch circle of the rolling elements 4 in the row on the outside in the axial direction and the diameter of the pitch circle of the rolling elements 4 in the row on the inside in the axial direction are the same. However, it is possible to employ construction of so-called asymmetric type so that the diameter of the pitch circle of the rolling elements 4 in the row on the outside in the axial direction can be larger or smaller than the diameter of the pitch circle of the rolling elements 4 in the row on the inside in the axial direction. In this case, it is possible to employ construction in which the ball diameter of the rolling elements 4 in the row on the outside in the axial direction and the ball diameter of the rolling elements 4 in the row on the inside in the axial direction are different. Further, although balls are used as rolling elements 4 in this example, it is also possible to use tapered rollers instead of the balls.

Here, a seal member 7b is fit into the inner circumferential surface of the outside end portion in the axial direction of the outer ring 2 and the tip end portion of the seal lip of the seal member 7b comes in sliding contact with the surface of the hub 3a. Because of this, the outside end portion in the axial direction of the cylindrical space that exists between the inner circumferential surface of the outer ring 2 and the outer circumferential surface of the hub 3a is sealed. On the other hand, a nonmagnetic metal plate cover 34 having a bottomed cylindrical shape is fit into the inner circumferential surface of the inside end section in the axial direction of the outer ring 2. Because of this, the inside end section in the axial direction of the inner space of the outer ring 2 is sealed. However, it is also possible to employ construction in which the inside end section in the axial direction of the cylindrical space is sealed by making the tip end portion of the seal lip of a seal member comes in sliding contact with the surface of the hub 3a directly or via a slinger.

An encoder 19, which has an L-shaped cross section and has a circular ring shape as a whole, is fitted and secured onto the outer circumferential surface of the inside end section in the axial direction of the hub 3a. The N pole and S pole are uniformly spaced alternatively with respect to the circumferential direction on the inside surface in the axial direction of the encoder 19. The inside surface in the axial direction of the encoder 19 faces the detection section of the rotational speed sensor via the cover 34. Because of this, it is possible to detect the rotational speed of the wheels that are supported and secured to the rotating-side flange 11a. However, it is also possible to omit the encoder 19.

With the hub unit bearing 1a of this example, the effect to the runout accuracy of the flange surface 14 caused by screwing the hub bolts into the female screw portions 27 of the mounting holes 12a can be removed by the same reason as of the conventional construction. That is, the mounting holes 12a are open only to the bottom surface 16 of the annular groove 15. And part of the bottom surface 16 exists on portions adjoining to both sides of the opening portions on the outside in the axial direction of the mounting holes 12a. Because of this, even if the hub bolts are screwed into the female screw portions 27 of the mounting holes 12a and portions around the opening portions on the outside in the axial direction of the mounting holes 12a plastically deform, it is possible to make the bumps occurred by this plastic deformation to be retained within the annular groove 15.

When driving a vehicle, water such as rain water and mud slurry may enter the gap 32 via the water drain holes 17a, the abutment part between the inside surface in the axial direction of the brake rotor 22 and the flange surface 14, and through the fitting portion between the hub bolts 13 and the mounting holes 12a. In the hub unit bearing 1a of this example, it is made difficult for the water having entered the gap 32 to be retained within this gap 21 and is made easier to be drained to the outer space via the water drain holes 17a.

That is, the outer diameter DO of the annular groove 15 is larger than the diameter DDI of the inscribed circle of the water drain holes 17a, and is smaller than the diameter DDO of the circumscribed circle of the water drain holes (DDI<DO<DDO). Therefore, even when the water having entered the gap 32 moves to the outer end portion in the radial direction within the gap 32, this water is taken into the through portions 28 from the concave surface portions 29 provided on the outer-diameter side peripheral surface of the annular groove 15. Further, the water taken into the through portions 28 is drained from the openings on the inside in the axial direction of the water drain holes 17a to the outer space.

As such, in this example, the construction of the water drain holes 17a improves the draining of the rotating-side flange 11a. That is, the water within the gap 32 is easy to be drained and it is difficult for water to be retained within the gap 32 so that even when the centrifugal force is applied to this water due to the rotation of the wheels, it is possible to prevent water enters between the inside surface in the axial direction of the brake rotor 22 and the flange surface 14 and prevent rust and deterioration due to progress of the rust, as well as adhesion due to fretting. Further, like this example, in construction where hub bolts are screwed into the female screw portions 27 of the mounting holes 12a, it is also possible to prevent rust of the hub bolts and the female screw portions 27. As such, the hub bolts can be easily removed from the mounting holes 12a when performing maintenance.

Figure 10:
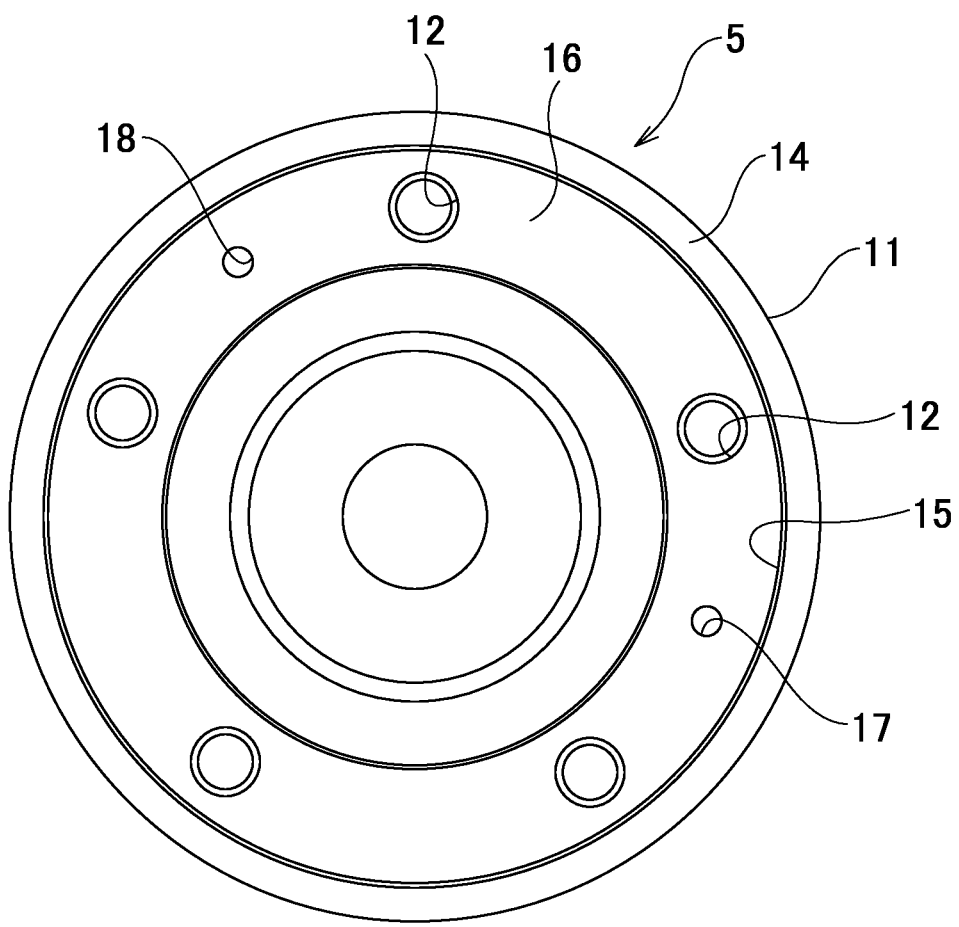
FIG. 10 is an end view illustrating a hub unit bearing in a state of being taken out of the conventional construction as seen from left in FIG. 9.

Here, the rotating-side flange 11a can further comprise at least one setscrew hole 18 (see FIG. 10). The setscrew hole 18 is used to provisionally tack the brake rotor 22 with respect to the rotating-side flange 11, as well as to screw bolts for removing the brake rotor 22 that is fixed to the flange surface 14 due to rust and the like from the flange surface 14.

In this example, the inner diameter of the water drain holes 17a is larger than the inner diameter of the prepared holes before forming the female screw portions 27 on the inner circumferential surface of the mounting holes 12a. Here, the inner diameter of the water drain holes 17a can be smaller than the inner diameter of the prepared holes of the mounting holes 12a. When the inner diameter of the water drain holes 17a is made to be the same as of the inner diameter of the prepared holes of the mounting holes 12a, it is possible to perform piercing of the water drain holes 17a and piercing of the mounting holes 12a by using a cutting tool having the same processing diameter so that it is possible to reduce manufacturing cost. Further, depends on the inner diameter of the water drain holes 17a, it is also possible for the water drain holes 17a to have a function as work holes for inserting tools and the like when assembling or performing maintenance.

Second Example of First Embodiment

Figure 4:
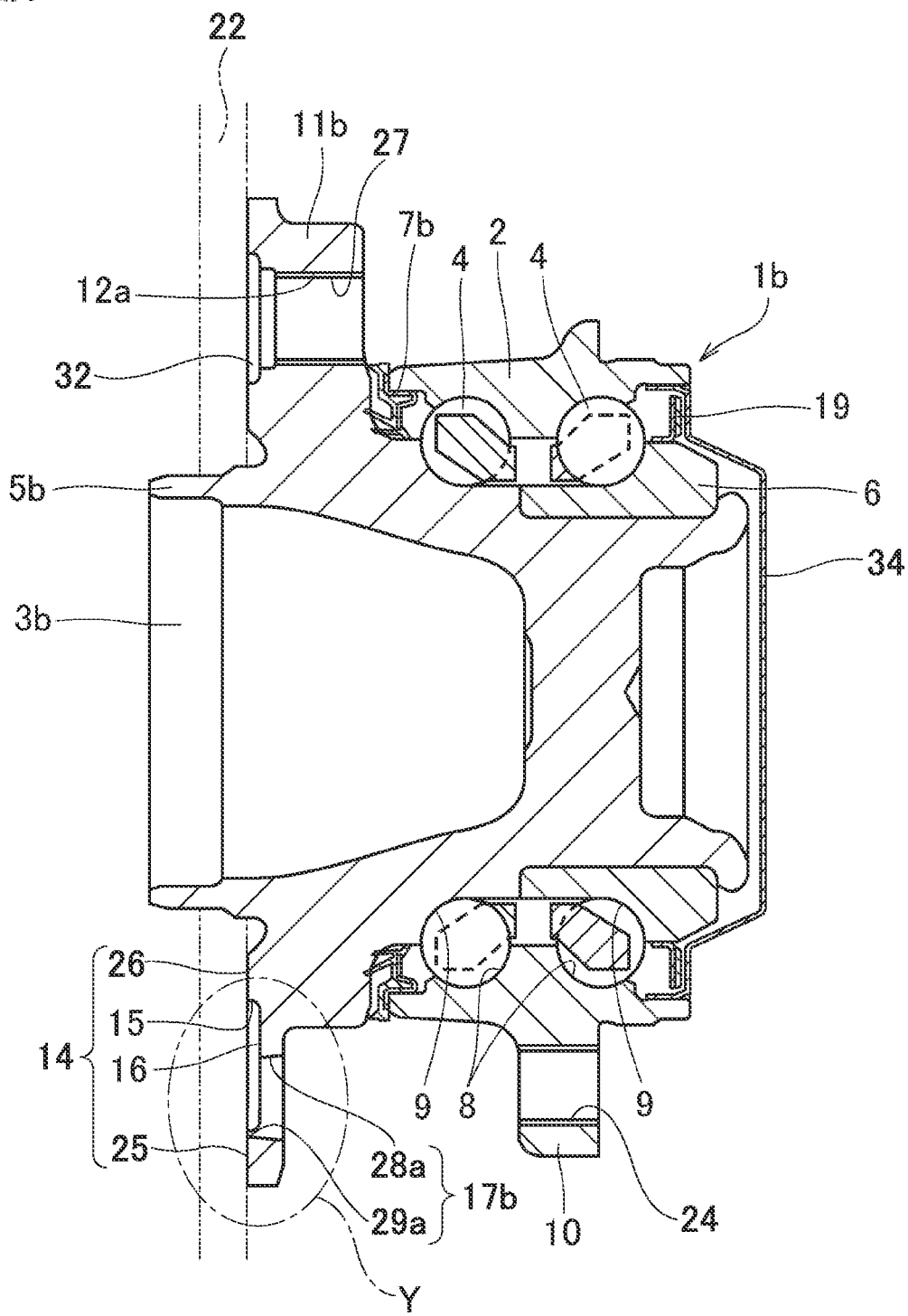
FIG. 4 is a cross-sectional view illustrating a hub unit bearing of a second example of the first embodiment.

FIG. 4 illustrates a second example of the first embodiment of the present invention. In the hub unit bearing 1b of this example, the inner circumferential surface of the water drain holes 17b is a tapered surface having an inner diameter that becomes larger toward inward in the axial direction. As such, when the water that entered the gap 32 between the bottom surface 16 of the annular groove 15 and the inside surface in the axial direction of the brake rotor 22 is taken into the water drain holes 17b from the concave surface portions 29a of the water drain holes 17a, this water is led to the inside in the axial direction along the concave surface portions 29a of the water drain holes 17b and the inner circumferential surface of the through portions 28a and is drained to the outer space from the openings on the inside in the axial direction of the water drain holes 17b. Like this, the construction of the water drain holes 17b improves the draining of the rotating-side flange 11b.

The method for forming the water drain holes 17b is not specifically limited. For example, it is possible to form it by forming the external form of the hub body 5b of the hub 3b by forging process or casting process, and then forming the water drain holes 17b at a plurality of locations in the circumferential direction of the rotating-side flange 11b by machining. Alternatively, when forming the external form of the hub body 5b by forging process, it is also possible to form it by strongly stamping a plurality of portions in the circumferential direction on the inside surface in the axial direction of the rotating-side flange 11b with a punch having a draft angle inclined with the same inclination angle as that of the inner circumferential surface of the water drain holes 17b.

Although it is omitted in the figure, it is also possible to make only the inner circumferential surface of the outside portion of the water drain holes 17b with respect to the radial direction to be a tapered surface that is inclined in the direction outward in the radial direction toward inward in the axial direction and the inner circumferential surface of the inner side portion of the water drain holes 17b with respect to the radial direction to be a concave surface that is partially cylindrical. Alternatively, it is also possible to form water drain holes 17b to be inclined in the direction inward in the radial direction toward outward in the axial direction. The construction and functions of the other parts are the same as in the first example of the first embodiment including the number and its location of the water drain holes 17b.

Third Example of First Embodiment

Figure 5A:
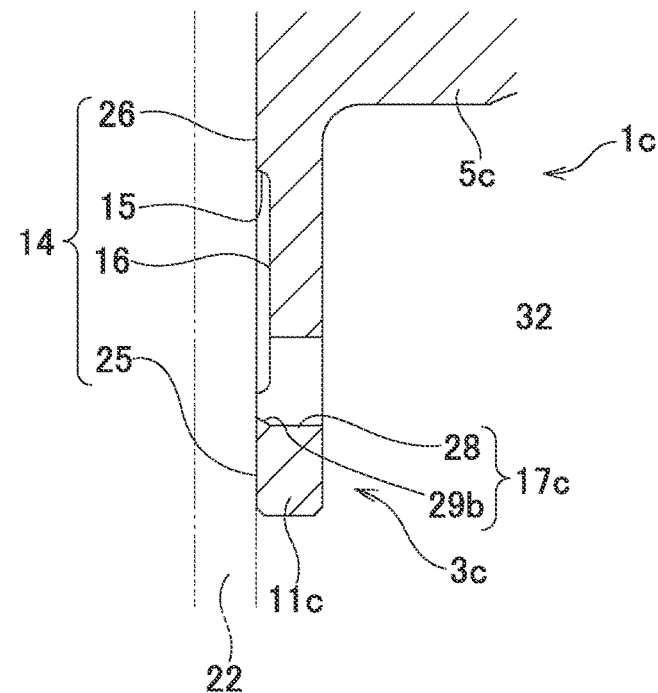
FIG. 5(A) is a view corresponding to an enlarged view of Y part of FIG. 4 of a third example of the first embodiment.
Figure 5B:
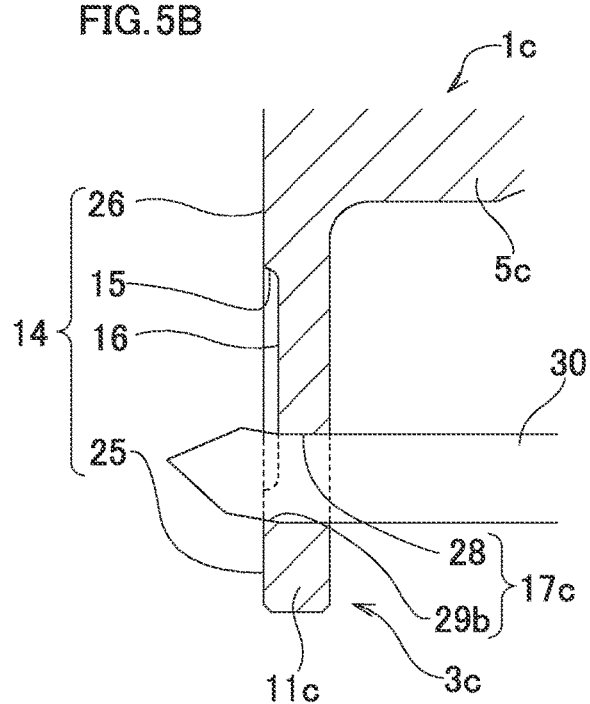
FIG. 5(B) is a view for explaining an example of the process of forming a water drain hole in the third example of the first embodiment.

FIGS. 5(A) and 5(B) illustrate a hub body 5c of a hub unit bearing 1c of a third example of the first embodiment of the present invention. In this example, only the concave surface portions 29b of the water drain holes 17c are inclined in the direction outward in the radial direction toward inward in the axial direction. On the other hand, the inner diameter of the communication portions 28 of the water drain holes 17c is constant all the way in the axial direction.

In this example, when the water having entered the gap 32 between the bottom surface 16 of the annular groove 15 and the inside surface in the axial direction of the brake rotor 22 is taken from the concave surface portions 29b, this water is certainly led to the inside of the through portions 28 along the concave surface portions 29b. The water having entered inside the through portions 28 does not stay within the gap 32 and is drained to the outer space from the openings on the inside in the axial direction of the water drain holes 17c. The construction of the water drain holes 17c improves the draining of the rotating-side flange 11c.

To form the water drain holes 17c, as shown in FIG. 5(B), it is only required to drill the rotating-side flange 11c from the inside to the outside in the axial direction with a drill 30. That is, of the rotating-side flange 11c, the drill 30 proceeds straight parallel to the center axis of the hub 3c as long as it is drilling the portion on the inside than the bottom surface 16 of the annular groove 15 in the axial direction. When the tip end portion of the drill 30 comes to a portion of the rotating-side flange 11c that overlaps the annular groove 15 in the radial direction, the tip end portion of the drill 30 turns to a direction where the cutting resistance is small as exaggeratedly illustrated in FIG. 5(B). That is, the tip end portion of the drill 30 is inclined in the direction inward in the radial direction toward outward in the axial direction. Therefore, it is possible to make the concave surface portions 29b to be inclined in the direction outward in the radial direction toward inward in the axial direction.

Like this, the water drain holes 17c do not require any special tool or troublesome processing and it can be easily formed only by drilling the rotating-side flange 11a with the drill 30. That is, when compared to the construction of the second example of the first embodiment, the manufacturing cost can be even reduced.

Figure 5C:
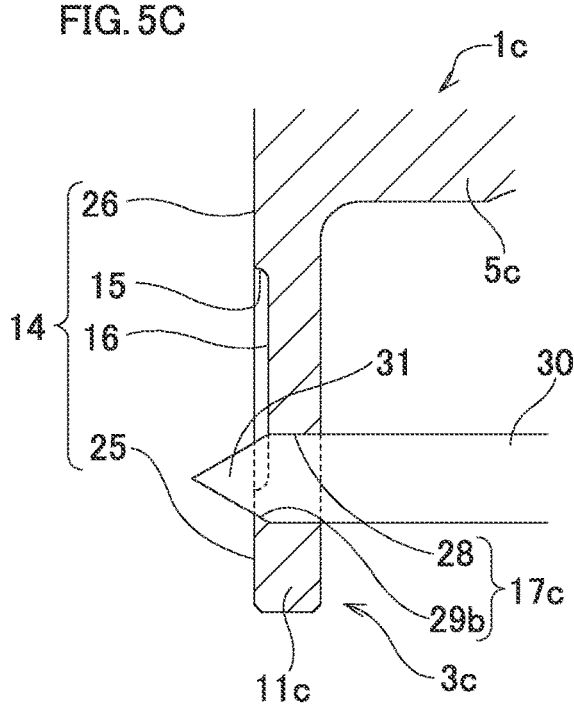
FIG. 5(C) is a view for explaining another example of the process of forming a water drain hole in the third example of the first embodiment.

By regulating the displacement magnitude of the drill 30 when drilling, it is also possible to form water drain holes 17c. That is, the drill 30 has conical shaped portion 31 having the outer diameter that becomes smaller toward the tip end on the tip end portion. When drilling a plurality of the circumferential direction of the rotating-side flange 11c from the inside in the axial direction with the drill 30, as illustrated in FIG. 5(c), the drilling is completed when the tip end portion of the conical shaped portion 31 protrudes from the flange surface 14 of the rotating-side flange 11c. According to such method, even when the processing diameter of the drill 30 is large and its rigidity is high, it is possible to form it only by regulating the displacement magnitude of the drill 30 when drilling.

In this example, the location in the axial direction of the inside edge in the axial direction of the concave surface portions 29b corresponds to the location in the axial direction of the bottom surface 16 of the annular groove 15. However, it is also possible to form the portion inclined in the direction outward in the radial direction toward inward in the axial direction of the water drain holes 17c to the inside in the axial direction than the bottom surface 16 of the annular groove 15. That is, in the present invention, it is possible to employ construction in which the water drain holes 17c has an inclined surface, which is inclined in the direction where the inner diameter becomes larger toward inward in the axial direction, in the outside section in the axial direction including the portion that overlaps the annular groove 15 in the radial direction. The construction and functions of the other parts are the same as in the first example and the second example of the first embodiment including the number and its location of the water drain holes 17c.

Fourth Example of First Embodiment

Figure 6:
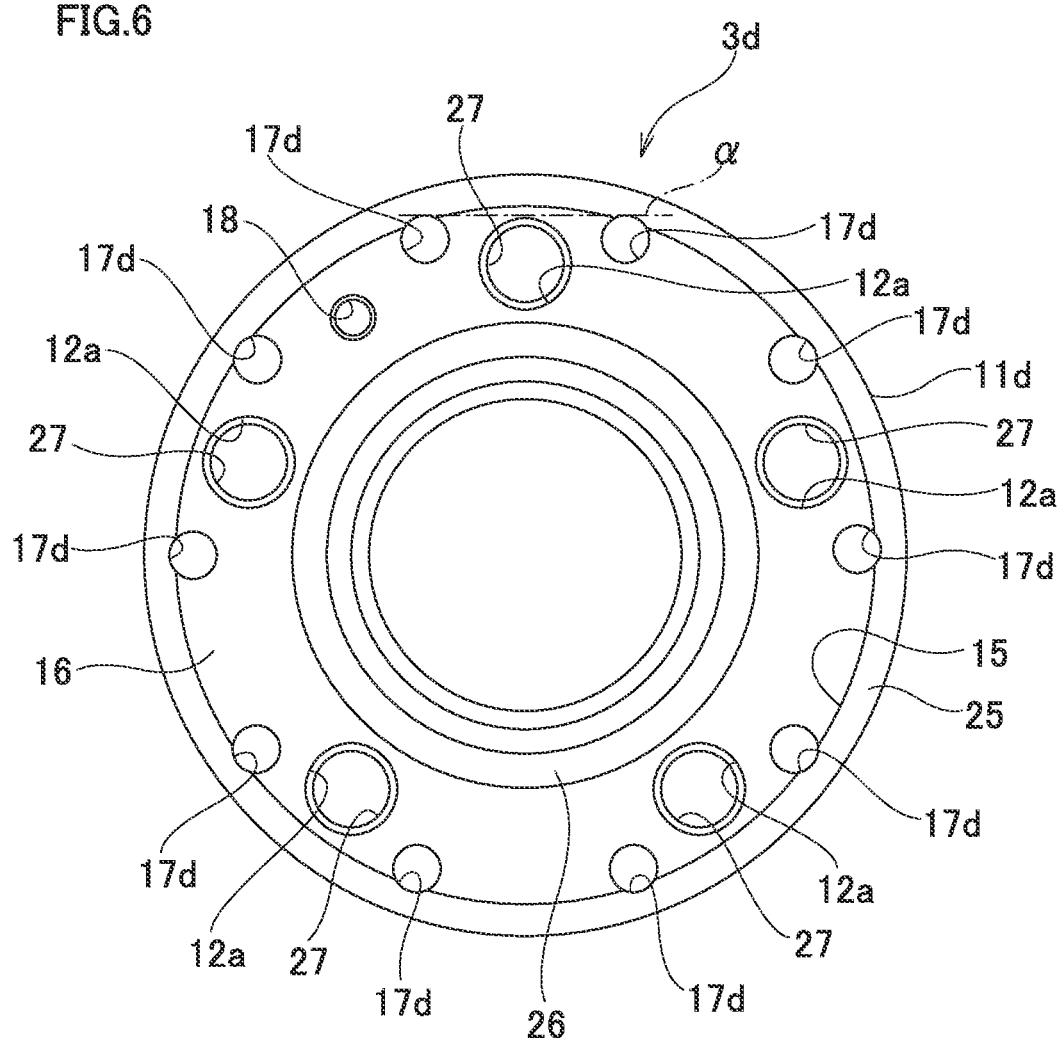
FIG. 6 is a view illustrating a fourth example of the first embodiment, corresponding to FIG. 2.

FIG. 6 illustrates the fourth example of the first embodiment. In this example, the rotating-side flange 11d of the hub 3d has the water drain holes 17d twice the number of the mounting holes 12a and one setscrew hole 18. More specifically, in this example, the number of the mounting holes 12a is five and the number of the water drain holes 17d is ten.

The water drain holes 17d are positioned on both sides of the mounting holes 12a with respect to the circumferential direction. The mounting holes 12a are positioned in the center position between a pair of water drain holes 17d adjoining to each other with respect to the circumferential direction.

The setscrew hole 18 passes through the rotating-side flange 11d in the axial direction, and the outside end in the axial direction of the setscrew hole 18 is open in the middle section in the radial direction of the bottom surface 16 of the annular groove 15. However, it is also possible to omit the setscrew hole 18 as well as to provide it so as to be uniformly spaced at a plurality of locations in the circumferential direction in order to suppress discrepancy of the center of gravity with respect to the center of rotation of the rotating-side flange 11d.

The symbol a in FIG. 6 represents the common tangent that contacts the outer side portion in the radial direction of the hub 3d among the opening portion on the outside in the axial direction of a pair of water drain holes 17d that are provided on both sides of the mounting holes 12a with respect to the circumferential direction of the hub 3d. In this example, the mounting holes 12a exist more inward in the radial direction than the common tangent α.

In this example, regardless the rotation phase of the rotating-side flange 11d when the vehicle is stopped, a part of the water drain holes 17d always exists in the vertical direction more downward than the mounting holes 12a. As such, it is possible to prevent the mounting holes 12a to be soaked in the water having entered the gap 32 between the bottom surface 16 of the annular groove 15 and the inside surface in the axial direction of the brake rotor 22. As a result, the hub bolts and the female screw portions 27 of the mounting holes 12a can be effectively prevented from rusting.

Here, if the mounting holes 12a exist more inward than the common tangent α, it is possible to employ construction so that the same number of the mounting holes 12a and the water drain holes 17d are alternatively provided in the circumferential direction.

It is also possible for this example to be combined with the second example or the third example of the first embodiment to embody. That is, it is possible to employ construction in which the inner circumferential surface of the water drain holes 17d has a tapered surface having an inner diameter that becomes larger toward inward in the axial direction, or the concave surface portion of the water drain holes 17d is inclined in the direction outward in the radial direction toward inward in the axial direction. The construction and functions of the other parts are the same as in the first example of the first embodiment.

Fifth Example of First Embodiment

Figure 7:
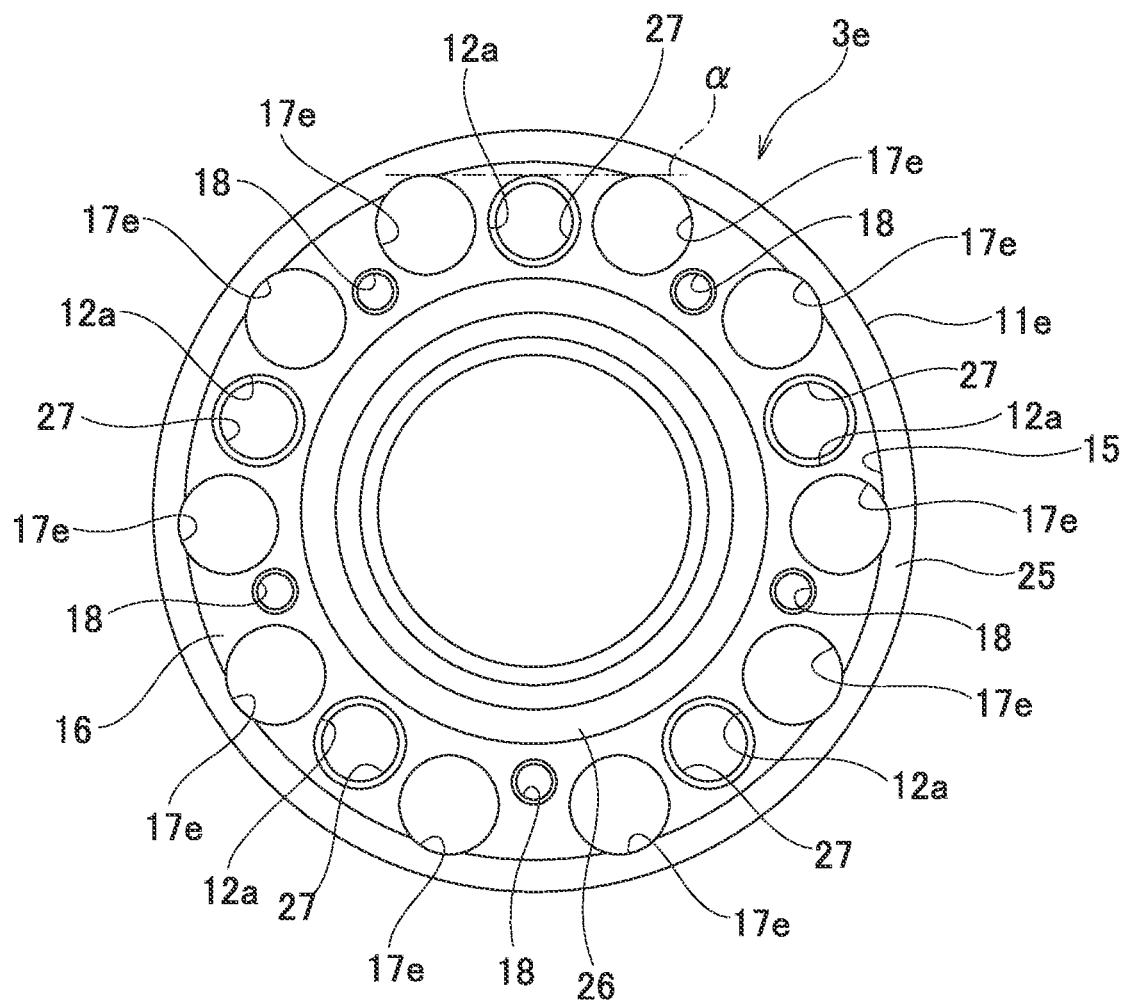
FIG. 7 is a view showing illustrating a fifth example of the first embodiment, corresponding to FIG. 2.

FIG. 7 illustrates the fifth example of the first embodiment. In this example, the rotating-side flange 11e of the hub 3e has water drain holes 17e twice the number of the mounting holes 12a, and the same number of setscrew holes 18 as of mounting holes 12a. More specifically, in this example, the number of the mounting holes 12a is five and the number of the water drain holes 17d is ten, and the number of screw holes is five.

The mounting holes 12a exist more inward in the radial direction than the common tangent a as with the fourth example of the first embodiment. That is, regardless of the rotation phase of the rotating-side flange 11e when the vehicle is stopped, a part of the water drain holes 17e always exists more downward in the vertical direction than the mounting holes 12a. Further, in this example, the inner diameter of the water drain holes 17e is larger than the inner diameter of the water drain holes 17d of the fourth example of the first embodiment.

The setscrew holes 18 are positioned so as to be uniformly spaced in a plurality of portions in the circumferential direction of the rotating-side flange 11e and in the center position of the mounting holes 12a that are adjacent to each other in the circumferential direction. The setscrew holes 18 pass through the rotating-side flange 11e in the axial direction and are open on the inner side in the radial direction than the middle section in the radial direction of the bottom surface 16 of the annular groove 15.

In this example, the water drain holes 17e have a function as work holes for inserting tools when assembling or performing maintenance. Further, the construction of this example has a lighter rotating-side flange 11e compared to that of the fourth example of the first embodiment as the inner diameter of the water drain holes 17e is larger as well as the number of the setscrew holes 18 is larger.

As with the fourth example of the first embodiment, this example can also be combined with the second example or the third example of the first embodiment to embody. That is, it is also possible to employ construction so that the inner circumferential surface of the water drain holes 17e is a tapered surface having an inner diameter that becomes larger toward inward in the axial direction, or the concave surface portion of the water drain holes 17e is inclined in the direction outward in the radial direction toward inward in the axial direction. The construction and functions of the other parts are the same as in the first example of the first embodiment.

Figure 9:
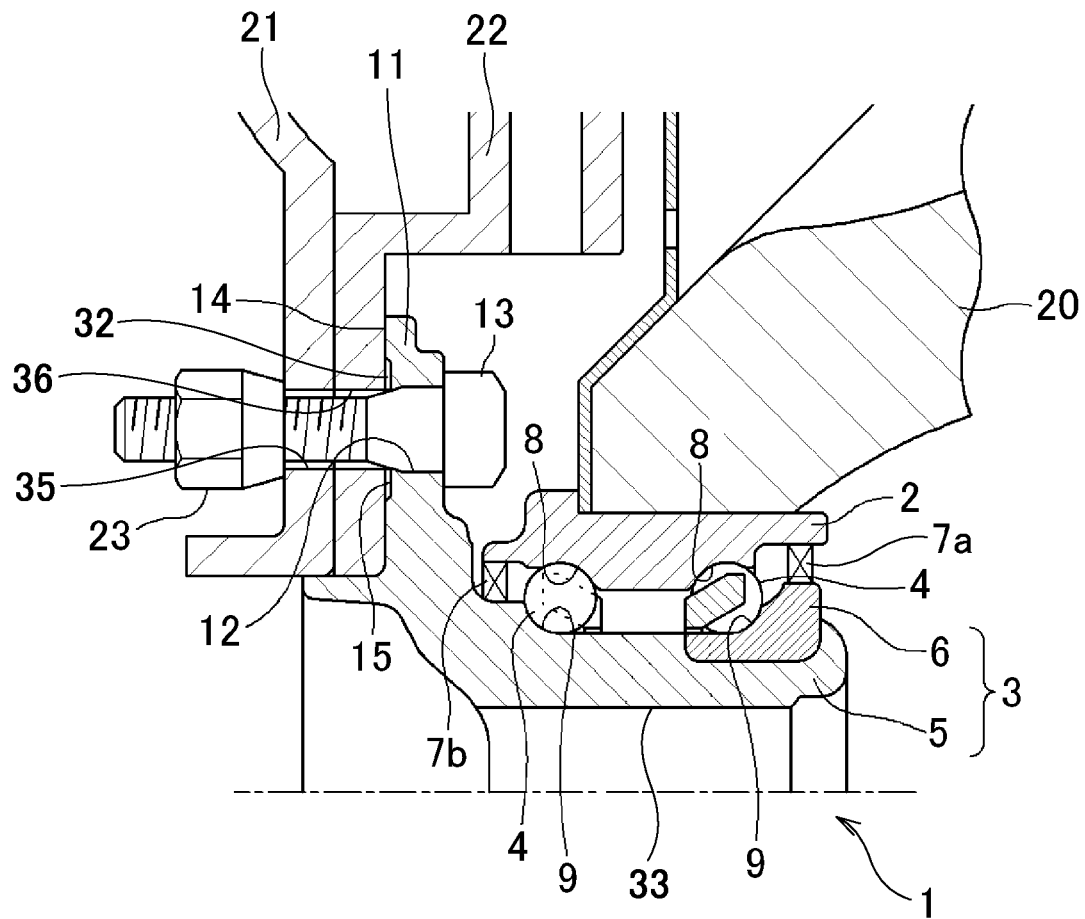
FIG. 9 is a cross-sectional view illustrating an example of conventional construction of a portion that supports a wheel and a brake rotor so as to be able to rotate freely with respect to the suspension.

In the first example through the fifth example of the first embodiment that are described above, it was explained as in the case when the present invention was applied to a hub unit bearing for a non-driven wheel in which the inner ring rotates. However, the present invention can also be applied to a hub unit for a driven wheel in which the inner ring rotates. As illustrated in FIG. 9, the hub unit bearing for a driven wheel has an engaging hole 33 for engaging with a drive shaft to be able to transmit torque.

Example of Second Embodiment

Figure 8:
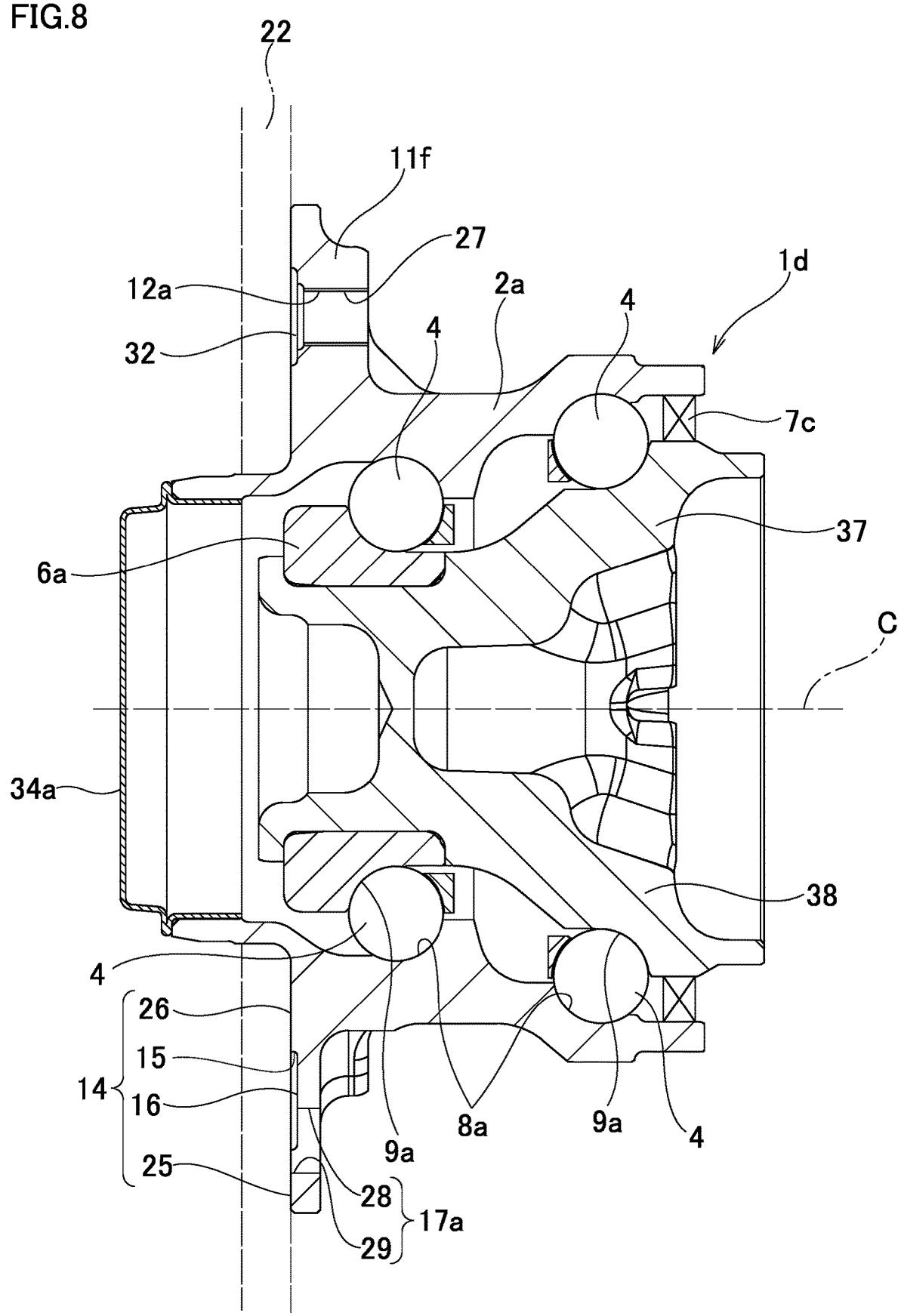
FIG. 8 is a cross-sectional view illustrating the hub unit bearing of an example of the second embodiment.

FIG. 8 illustrates an example of the second embodiment of the present invention. This example is an example of applying the present invention to a hub unit bearing 1d for a non-driven wheel in which the outer ring rotates. The hub unit bearing 1c comprises an inner member 37, an outer ring 2a, which corresponds to an outer member and a rotating member, and a plurality of rolling elements 4.

The inner member 37 has double row inner-ring raceways 9 in the outer circumferential surface thereof. Further, the inner member 37 has a stationary side flange, which protrudes inward in the radial direction than the portion adjoining to the outside in the axial direction of the stationary side flange 10, in the middle section in the axial direction of the inner diameter side. The stationary side flange 10 has screw holes (not shown) at a plurality of locations in the circumferential direction of the inside surface in the axial direction. The inner member 37 is supported and secured to the suspension by screwing the bolts that are supported to the suspension to these screw holes.

In this example, the inner member 37 comprises an inner member body 38 and an inner ring 6a. The inner member body 38 has an inner-ring raceway 9a on the inside in the axial direction on the outer circumferential surface of the inside section in the axial direction and is provided with the stationary side flange 10 on the inner diameter side. The inner ring 6a has an inner-ring raceway 9a on the outside in the axial direction on the outer circumferential surface and is fit with an interference fit onto the outside end portion in the axial direction of the inner member body 38.

The outer ring 2a is positioned coaxially with the inner member 37 around the inner member 37. The outer ring 2a has double row outer-ring raceways 8a on the inner circumferential surface. Further, the outer ring 2a has a rotating-side flange 11f, which protrudes outward in the radial direction than the portion adjoining to the both sides in the axial direction of the rotation-side flange 11f, in the middle section in the axial direction.

As with the rotating-side flange 11a of the first example of the first embodiment, the rotating-side flange 11f has a flange surface 14 which is the outside surface in the axial direction of this rotating-side flange 11f, mounting holes 12a, and water drain holes 17a. Further, the outer diameter of the annular groove 15 is smaller than the diameter of the circumscribed circle of the water drain holes 17a that is centered about the reference axis C that is the center axis of the inner member 37.

The rolling elements 4 are located between each of double row outer-ring raceways 8a and double row inner-ring raceways 9a so as to be able to roll freely.

Here, the seal member 7c is fit into the inner circumferential surface of the inside end section in the axial direction of the outer ring 2a, and the tip end portion of the seal lip of the seal member 7c comes in sliding contact with the surface of the inner member 37 directly or via a slinger. Because of this, the inside end section in the axial direction of the cylindrical space that exists between the inner circumferential surface of the outer ring 2a and the outer circumferential surface of the inner member 37 is sealed. On the other hand, a cover 34 having a bottomed cylindrical shape is fit into the inner circumferential surface of the outside end section in the axial direction of the outer ring 2. Because of this, the outside end section in the axial direction of the inner space of the outer ring 2 is sealed. Moreover, a cover 34a having a bottomed cylindrical shape is fit into the inner circumferential surface of the outside end section in the axial direction of the outer ring 2 so as to seal the outside end section in the axial direction of the inner space of the outer ring 2a.

The hub unit bearing 1d of this example as well, the same as in the case of the hub unit bearing 1a of the first example of the first embodiment, it is difficult for the water having entered the gap 32 between the bottom surface 16 of the annular groove 15 and the inside surface in the axial direction of the brake rotor 22 to be retained within this gap 32 and is easier to be drained to the outer space through the water drain holes 17a.

As long as no inconsistency occurs, this example can be embodied in combination with the second example through the fifth example of the first embodiment. That is, it is possible to employ construction, of which the inner circumferential surface of the water drain holes 17a is a tapered surface having an inner diameter that becomes larger toward inward in the axial direction, or the concave surface portions 29 of the water drain holes 17a is inclined in the direction outward with respect to the radial direction of the outer ring 2a toward inward in the axial direction. Alternatively or additionally, it is possible to employ construction of which the water drain holes 17a are positioned on both sides of the mounting holes 12a with respect to the circumferential direction of the outer ring 2a and the mounting holes 12a exist more inward in the radial direction of the outer ring 2a than the common tangent α. The construction and functions of the other parts are the same as in the first example of the first embodiment.

EXPLANATION OF REFERENCE NUMBERS 1, 1a-1c Hub unit bearing
2, 2a Outer ring
3, 3a-3e Hub
4 Rolling elements
5, 5a-5c Hub body
6, 6a Inner ring
7a-7c Seal member
8, 8a Outer-ring raceway
9, 9a Inner-ring raceway
10 Stationary side flange
11, 11a-11f Rotating-side flange
12, 12a Mounting hole
13 Hub bolt
14 Flange surface
15 Annular groove
16 Bottom surface
17, 17a-17d Water drain hole
18 Setscrew hole
19 Encoder
20 Knuckle
21 Wheel
22 Brake rotor
23 Hub nut
24 Supporting hole
25 Outer abutting portion
26 Inner abutting portion
27 Female screw portion
28 Through portion
29, 29a Concave surface portion
30 Drill
31 Conical shaped portion
32 Gap
33 Engaging hole
34, 34a Cover
35 Through hole
36 Through hole
37 Inner member
38 Inner member body

What is claimed is:

1. A hub unit bearing comprising:
an outer member having an outer-ring raceway on an inner circumferential surface of the outer member;
an inner member having an inner-ring raceway on an outer circumferential surface of the inner member; wherein
one of the outer member or the inner member correspond to a rotation member that rotates in use, and the other of the outer member or the inner member is fixed to a knuckle of a suspension;
a plurality of rolling elements located between the outer-ring raceway and the inner-ring raceway so as to be able to roll freely; and
a rotating-side flange provided on the rotation member and protruding outward in a radial direction of the hub unit bearing,
wherein
the rotating-side flange has:
an outside surface in an axial direction facing outward in a width direction of a vehicle body when the hub unit bearing is assembled to the vehicle body,
an annular groove that is provided on the outside surface in the axial direction,
a plurality of mounting holes that are open to a bottom surface of the annular groove, and
a plurality of water drain holes that pass through the rotating-side flange in the axial direction, and the water drain holes have an open portion on an outside in the axial direction thereof, wherein
the annular groove has an outer diameter that is larger than a diameter of an inscribed circle of the opening portion on each of the plurality of the water drain holes, as viewed in the axial direction and smaller than a diameter of a circumscribed circle of the opening portion on each of the plurality of the water drain holes, as viewed in the axial direction.

2. The hub unit bearing according to claim 1, wherein the plurality of water drain holes have an inner circumferential surface that is inclined in a direction such that an inner diameter of the inner circumferential surface becomes larger as the water drain hole is going inward in the axial direction.

3. The hub unit bearing according to claim 1, wherein the plurality of the water drain holes have an inclined surface that is inclined outward in the radial direction as the water drain hole is going inward in the axial direction, at a portion in the axial direction of an inner circumferential surface of the water drain holes which overlaps with the annular groove in the radial direction.

4. The hub unit bearing according to claim 1, wherein the plurality of water drain holes are arranged such that the water drain holes are placed on both sides of the plurality of the mounting holes in relation to a circumferential direction of the hub unit bearing as viewed in the axial direction, wherein
each of the plurality of mounting holes is located radially inside a common tangent on the outside in the radial direction of the open portions of the water drain holes placed on the both sides.

5. The hub unit bearing according to claim 1, wherein the plurality of mounting holes have a female screw portion on each inner circumferential surface of the mounting holes.

* * * * *